United States Patent
Gaston

(10) Patent No.: US 10,465,413 B1
(45) Date of Patent: Nov. 5, 2019

(54) PORTABLE AWNING AND TABLE ASSEMBLY

(71) Applicant: Larry Gaston, Brooks, NY (US)

(72) Inventor: Larry Gaston, Brooks, NY (US)

( * ) Notice: Subject to any disclaimer, the term of this patent is extended or adjusted under 35 U.S.C. 154(b) by 0 days.

(21) Appl. No.: 16/153,894

(22) Filed: Oct. 8, 2018

(51) Int. Cl.
  *E04H 15/06* (2006.01)
  *B60J 11/02* (2006.01)
  *A45B 23/00* (2006.01)

(52) U.S. Cl.
  CPC ............... *E04H 15/06* (2013.01); *B60J 11/02* (2013.01); *A45B 2023/0006* (2013.01); *A45B 2023/0025* (2013.01)

(58) Field of Classification Search
  CPC .................................. E04H 15/06; B60J 11/02
  USPC .......... 135/88.07, 88.11, 88.12, 88.14, 88.16
  See application file for complete search history.

(56) References Cited

U.S. PATENT DOCUMENTS

| | | | | |
|---|---|---|---|---|
| 1,178,734 A | * | 4/1916 | Krause | E04H 15/06 135/116 |
| 2,815,762 A | * | 12/1957 | Smith | B60P 3/38 135/116 |
| 2,853,338 A | * | 9/1958 | Stanley | B60P 3/341 296/173 |
| 3,469,589 A | * | 9/1969 | Mitchell | B60P 3/38 135/87 |
| 3,599,651 A | * | 8/1971 | Perry | E04H 15/06 135/139 |
| 4,027,911 A | | 6/1977 | Johnson | |
| 4,109,954 A | | 8/1978 | Wall | |
| D291,074 S | | 7/1987 | Ravana | |
| 5,066,065 A | | 11/1991 | Baughman | |
| 5,080,426 A | | 1/1992 | Johnson | |
| 5,419,607 A | | 5/1995 | Oliveira | |
| 5,660,425 A | | 8/1997 | Weber | |
| 7,942,464 B2 | | 5/2011 | Schmidt | |
| 8,230,870 B2 | | 7/2012 | Horejsh | |
| 9,714,522 B2 | * | 7/2017 | Richmeier | B60R 11/00 |
| 10,145,140 B2 | * | 12/2018 | Woodard | E04H 15/06 |

\* cited by examiner

*Primary Examiner* — Noah Chandler Hawk

(57) ABSTRACT

A portable awning and table assembly includes a vehicle that has a cargo bed. A pair of first supports is each positionable in the cargo bed and a spool is rotatably coupled to between each of the first supports. A tarp is wrapped around the spool for storage and the tarp is selectively drawn off of the spool. A pair of second supports is spaceable a selected distance from the cargo bed. A pair of receivers is each coupled to a respective one of the second supports and engages the tarp when the tarp is drawn outwardly from the spool. In this way the tarp can shade an area therebeneath. A first table is removably coupled between the second supports having the first table is horizontally oriented for supporting objects. A second table is releasably coupled to the first table for increasing surface area for the objects.

11 Claims, 5 Drawing Sheets

US 10,465,413 B1

PORTABLE AWNING AND TABLE ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to awning and table devices and more particularly pertains to a new awning and table device for providing shade and a work surface proximate a vehicle.

BRIEF SUMMARY OF THE INVENTION

An embodiment of the disclosure meets the needs presented above by generally comprising a vehicle that has a cargo bed. A pair of first supports is each positionable in the cargo bed and a spool is rotatably coupled to between each of the first supports. A tarp is wrapped around the spool for storage and the tarp is selectively drawn off of the spool. A pair of second supports is spaceable a selected distance from the cargo bed. A pair of receivers is each coupled to a respective one of the second supports and engages the tarp when the tarp is drawn outwardly from the spool. In this way the tarp can shade an area therebeneath. A first table is removably coupled between the second supports having the first table is horizontally oriented for supporting objects. A second table is releasably coupled to the first table for increasing surface area for the objects.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
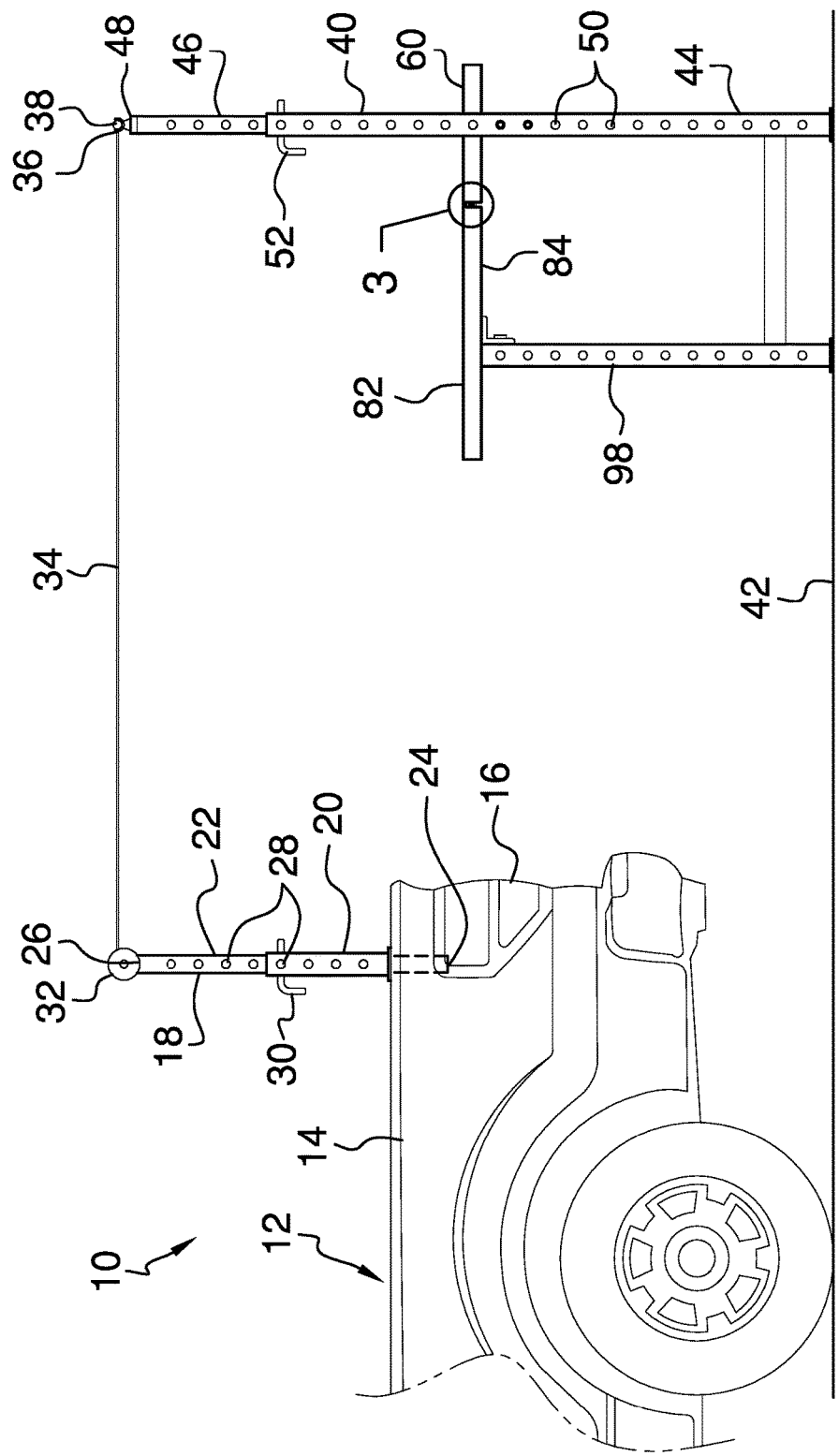
FIG. 1 is a perspective in-use view of a portable awning and table assembly according to an embodiment of the disclosure.
Figure 2:
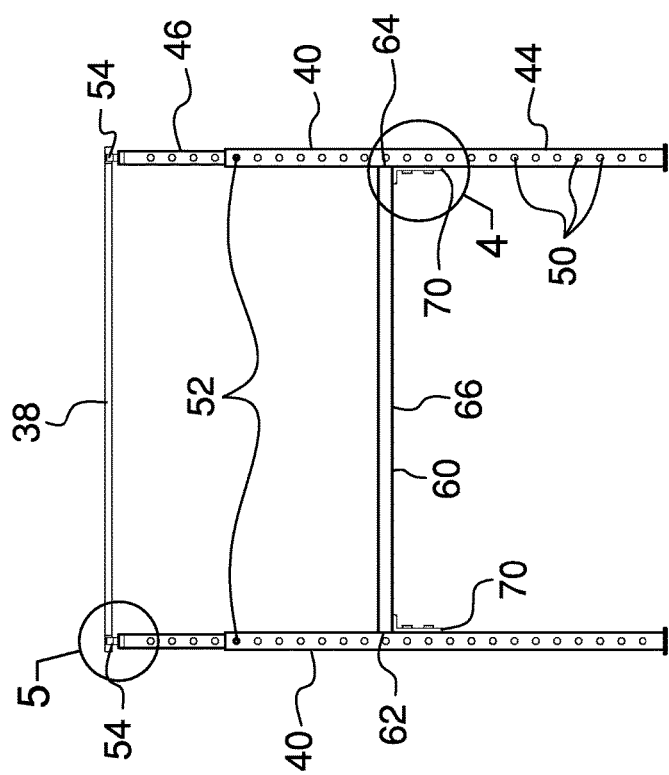
FIG. 2 is a back view of an embodiment of the disclosure.
Figure 3:
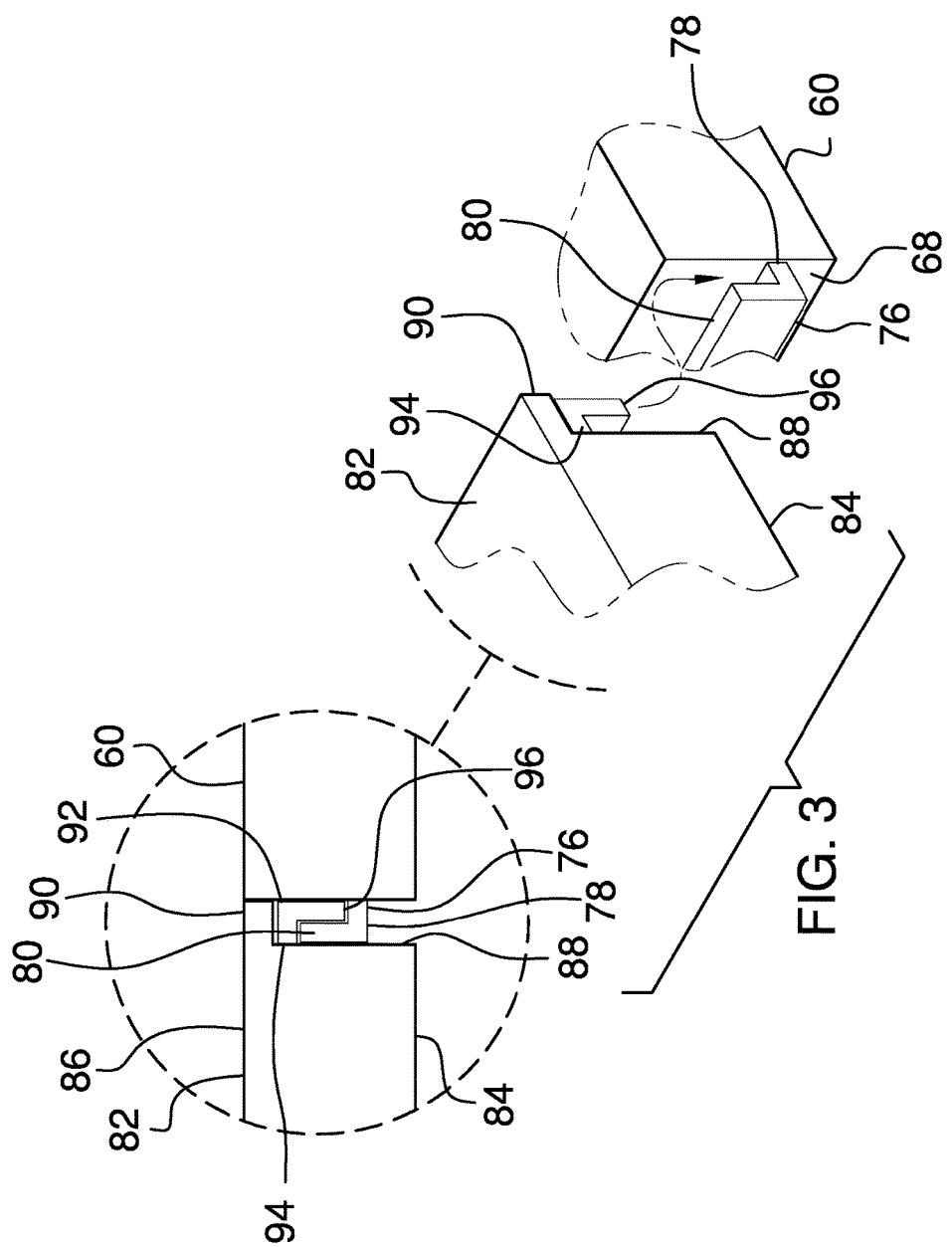
FIG. 3 is a detail view taken from circle 3 of FIG. 1 of an embodiment of the disclosure.
Figure 4:
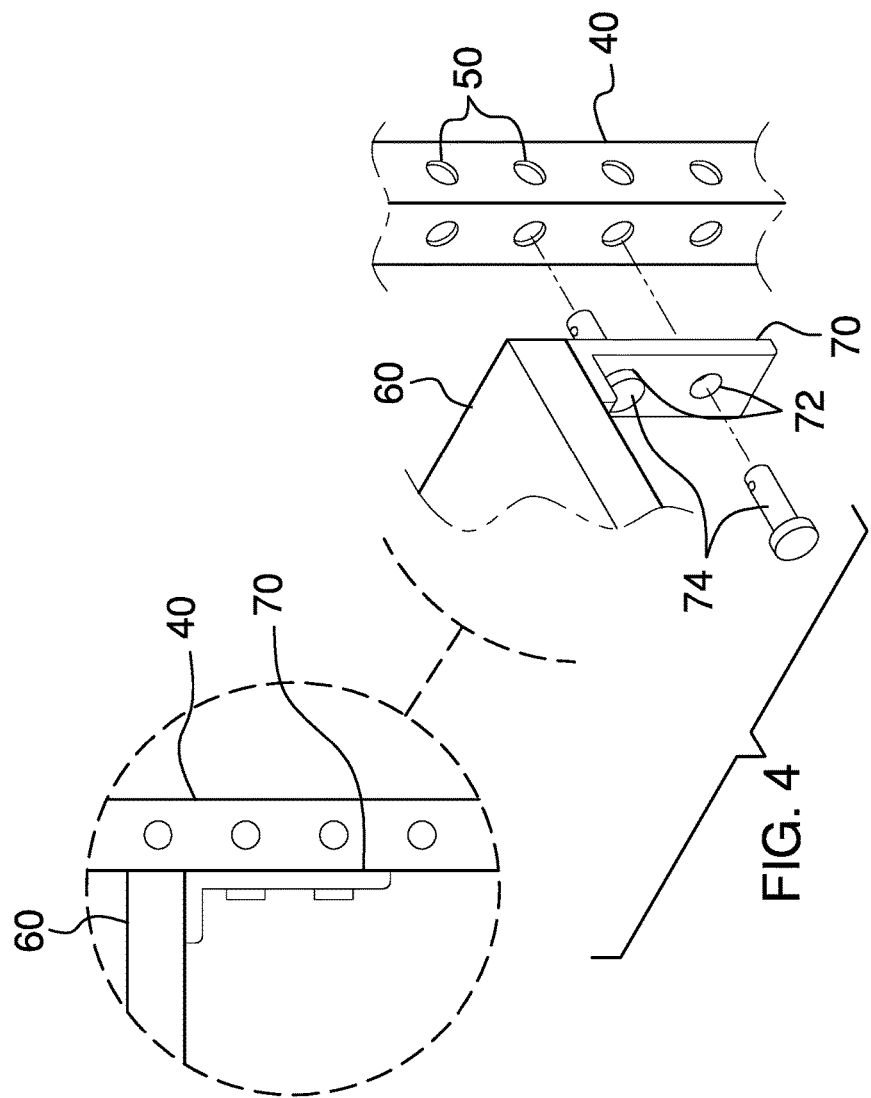
FIG. 4 is a detail view taken from circle 4 of FIG. 2 of an embodiment of the disclosure.
Figure 5:
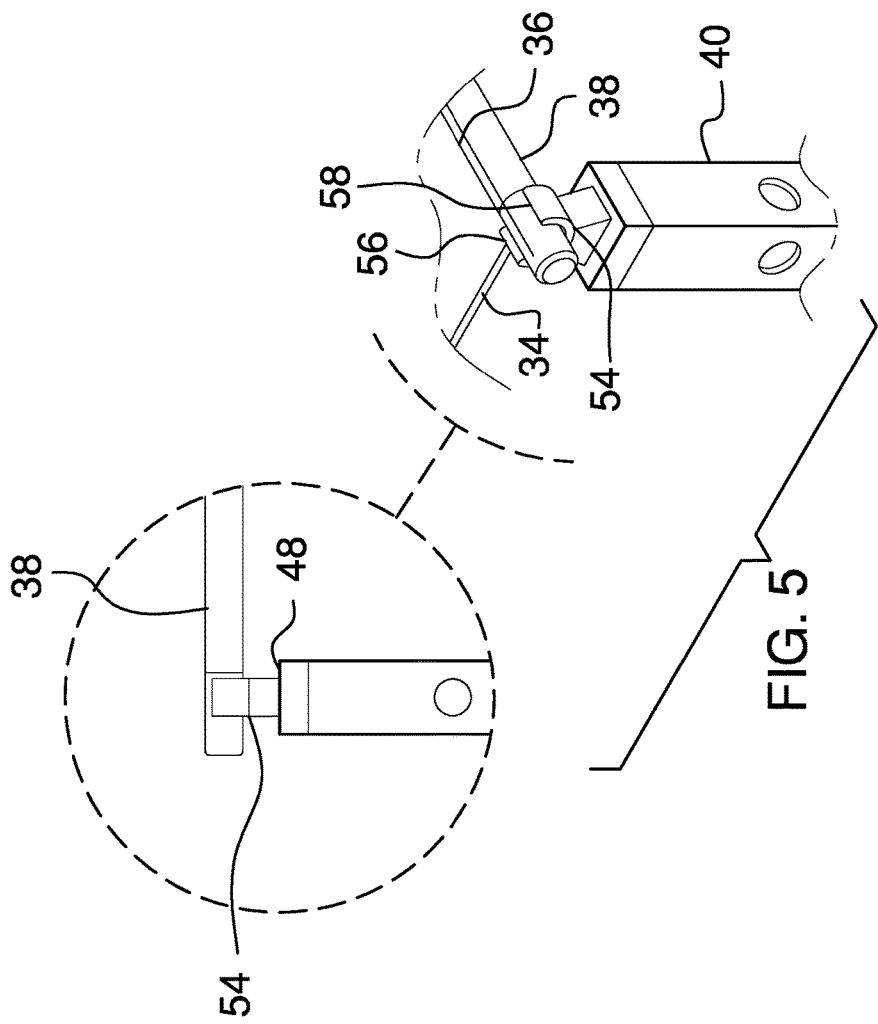
FIG. 5 is a detail view taken from circle 5 of FIG. 2 of an embodiment of the disclosure.

With reference now to the drawings, and in particular to FIGS. 1 through 5 thereof, a new awning and table device embodying the principles and concepts of an embodiment of the disclosure and generally designated by the reference numeral 10 will be described.

As best illustrated in FIGS. 1 through 5, the portable awning and table assembly 10 generally comprises a vehicle 12 that has a cargo bed 14 and the cargo bed 14 has a rear end 16. The vehicle 12 may be a pickup truck or other vehicle with a cargo bed. A pair of first supports 18 is each positionable in the cargo bed 14 having each of the first supports 18 being vertically oriented. Each of the first supports 18 comprises a first portion 20 slidably receiving a second portion 22 such that each of the first supports 18 has a telescopically adjustable height.

The first portion 20 has a lower end 24, the second portion 22 has an upper end 26 and each of the first 20 and second 22 portions has a plurality of engagement points 28 thereon. The engagement points 28 are distributed along an entire length of the first 20 and second 22 portions. The lower end 24 of the second portion 22 of each of the first supports 18 is inserted into a respective well on the cargo bed 14. A pair of first pins 30 is each extendable through a respective pair of the engagement points 28 on the first 20 and second 22 portions of a respective one of the first supports 18 for retaining the first supports 18 at a selected height.

A spool 32 is rotatably coupled to between each of the first supports 18 and the spool 32 is positioned on the upper end 26 of the first portion 20 of each of the first supports 18. The spool 32 is biased to rotate in a first direction and the spool 32 is urgeable to rotate in a second direction. The spool 32 may be a spring loaded spool or the like. A tarp 34 is wrapped around the spool 32 for storage and the tarp 34 can be selectively drawn off of the spool 32. The tarp 34 has a distal end 36 with respect to the spool 32 and the distal end 36 is spaced from the spool 32 when the tarp 34 is drawn off of the spool 32. The tarp 34 is wrapped around the spool 32 when the spool 32 rotates in the first direction. A pole 38 is coupled to and is coextensive with the distal end 36 of the tarp 34. The tarp 34 may have a length of approximately 10.0 feet and a width of approximately 6.0 feet.

A pair of second supports 40 is provided and each of the second supports 40 is vertically orientable on a support surface 42, such as ground or other horizontal support surface 42. Each of the second supports 40 is spaced a selected distance from the cargo bed 14. Each of the second supports 40 comprises a primary portion 44 slidably receiving a secondary portion 46 such that each of the second supports 40 has a telescopically adjustable height. The secondary portion 46 has a top end 48 and each of the primary 44 and secondary 46 portions has a plurality of engagement points 50 thereon. The engagement points 50 on the primary 44 and secondary 46 portions are distributed along an entire length of the primary 44 and secondary 46 portions. A pair of second pins 52 is each extendable through a selected pair of the engagement points 28 in the primary 44 and secondary 46 portions of a respective one of the second supports 40 for retaining the second supports 40 at a selected height.

A pair of receivers 54 is each coupled to a respective one of the second supports 40. Each of the receivers 54 engages the tarp 34 when the tarp 34 is drawn outwardly from the spool 32 to shade an area therebeneath. Each of the receivers 54 is positioned on the top end 48 of the secondary portion 46 of the respective second support 40, and each of the receivers 54 has a first edge 56 and a second edge 58. Each of the receivers 54 is concavely arcuate between the first 56 and second 58 edges such that each of the receivers 54 forms a U-shape and each of the receivers 54 insertably receives the pole 38 on the tarp 34.

A first table 60 is removably coupled between the second supports 40 having the first table 60 being horizontally oriented for supporting objects. The first table 60 has a first lateral side 62, a second lateral side 64, a bottom side 66 and a front side 68. A pair of couplers 70 is each coupled to and extends downwardly from the bottom side 66 of the first table 60. Each of the couplers 70 has a pair of apertures 72 extending therethrough. Additionally, each of the couplers 70 is aligned with a respective one of the first 62 and second 64 lateral sides of the first table 60.

A plurality of third pins 74 is each extendable through a respective one of the apertures 72 in a respective one of the couplers 70 to engage a selected one of the engagement points 28 in the primary portion 44 of a respective one of the second supports 40. In this way the first table 60 is removably coupled to the second supports 40. A first fastener 76 is coupled to the first table 60. The first fastener 76 is positioned on and is coextensive with the front side 68 of the first table 60. The first fastener 76 comprises a leg 78 extending forwardly from the front side 68 and a foot 80 extending upwardly from the leg 78 and being spaced from the front side 68.

A second table 82 is releasably coupled to the first table 60 for increasing surface area for the objects. The second table 82 has a lower side 84, a top side 86 and a rear side 88. Moreover, the top side 86 extends rearwardly beyond the rear side 88 to define a ledge 90 on the rear side 88. The second table 82 may have a depth that is greater than a depth of the first table 60.

A second fastener 92 is coupled to the second table 82, the second fastener 92 is positioned on and is coextensive with the rear side 88 and the second fastener 92 is positioned beneath the ledge 90. The second fastener 92 comprises a leg 94 extending rearwardly from the rear side 88 and a foot 96 extending downwardly from the leg 94 of the second fastener 92 and being spaced from the rear side 88. The foot 96 on the second fastener 92 is positioned between the foot 96 of the first fastener 76 and the front side 68 of the first table 60 to releasably couple the second table 82 to the first table 60. A pair of legs 98 is each coupled to and extends downwardly from the lower side 84 of the second table 82. Each of the legs 98 on the second table 82 abuts the support surface 42 when the second table 82 is coupled to the first table 60 for retaining the second table 82 in a horizontal orientation.

In use, each of the first supports 18 is coupled to the cargo bed 14 and each of the first supports 18 is adjusted to a selected height. Each of the second supports 40 is positioned a selected distance away from the cargo bed 14 and each of the second supports 40 is adjusted to a height that matches the height of the first supports 18. The tarp 34 is drawn outwardly from the spool 32 and the pole 38 on the tarp 34 is positioned in the receiver on each of the second supports 40 thereby facilitating the tarp 34 to shade the area beneath the tarp 34. The third pins 74 are extended through the respective coupler on the first table 60 to engage the second supports 40, thereby retaining the first table 60 at a selected height. The second table 82 can be coupled to the first table 60 in order to increase the surface area for supporting the objects. In this way the tarp 34 and the first and second table 82s facilitate a shaded area for a picnic, camping, a tailgate party and any other occasion outdoors.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this pawning document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable awning and table assembly being configured to be positioned on a vehicle for providing shelter, said assembly comprising:
   a vehicle having a cargo bed, said cargo bed having a rear end;
   a pair of first supports, each of said first supports being positionable in said cargo bed having each of said first supports being vertically oriented;
   a spool being rotatably coupled to between each of said first supports;
   a tarp being wrapped around said spool for storage, said tarp being selectively drawn off of said spool;
   a pair of second supports each being vertically orientable on a support surface, each of said second supports being spaced a selected distance from said cargo bed;
   a pair of receivers, each of said receivers being coupled to a respective one of said second supports, each of said receivers engaging said tarp when said tarp is drawn outwardly from said spool wherein said tarp is configured to shade an area therebeneath;
a first table being removably coupled between said second supports having said first table being horizontally oriented for supporting objects; and
a second table being releasably coupled to said first table for increasing surface area for the objects.

2. The assembly according to claim 1, wherein each of said first supports comprises a first portion slidably receiving a second portion such that each of said first supports has a telescopically adjustable height, said first portion having a lower end, said second portion having an upper end, each of said first and second portions having a plurality of engagement points thereon, said engagement points being distributed along an entire length of said first and second portions, said lower end of said second portion of each of said first supports being inserted into a receiver on said cargo bed.

3. The assembly according to claim 2, wherein said spool is positioned on said upper end of said first portion of each of said first supports, said spool being biased to rotate in a first direction, said spool being urgeable to rotate in a second direction.

4. The assembly according to claim 3, further comprising:
said tarp having a distal end with respect to said spool, said distal end being spaced from said spool when said tarp is drawn off of said spool; and
a pole being coupled to and being coextensive with said distal end of said tarp.

5. The assembly according to claim 1, wherein each of said second supports comprises a primary portion slidably receiving a secondary portion such that each of said second supports has a telescopically adjustable height, said secondary portion having a top end, each of said primary and secondary portions having a plurality of engagement points thereon, said engagement points on said primary and secondary portions being distributed along an entire length of said primary and secondary portions.

6. The assembly according to claim 5, wherein each of said receivers is positioned on said top end of said secondary portion of said respective second support, each of said receivers having a first edge and a second edge, each of said receivers being concavely arcuate between said first and second edges such that each of said receivers forms a U-shape, each of said receivers insertably receiving a pole on said tarp.

7. The assembly according to claim 5, further comprising:
said first table having a first lateral side, a second lateral side, a bottom side and a front side;
a pair of couplers, each of said couplers being coupled to and extending downwardly from said bottom side of said first table, each of said couplers having a pair of apertures extending therethrough, each of said couplers being aligned with a respective one of said first and second lateral sides of said first table;
a first pin;
a second pin; and
a plurality of third pins, each of said third pins being extendable through a respective one of said apertures in a respective one of said couplers to engage a selected one of said engagement points in said primary portion of a respective one of said second supports to removably couple said first table to said second supports.

8. The assembly according to claim 7, further comprising a first fastener being coupled to said first table, said first fastener being positioned on and being coextensive with said front side of said first table, said first fastener comprising a leg extending forwardly from said front side and a foot extending upwardly from said leg and being spaced from said front side.

9. The assembly according to claim 8, further comprising:
said second table having a lower side, a top side and a rear side, said top side extending rearwardly beyond said rear side to define a ledge on said rear side;
a second fastener being coupled to said second table, said second fastener being positioned on and being coextensive with said rear side, said second fastener being positioned beneath said ledge, said second fastener comprising a leg extending rearwardly from said rear side and a foot extending downwardly from said leg of said second fastener and being spaced from said rear side, said foot on said second fastener being positioned between said foot of said first fastener and said front side of said first table to releasbly couple said second table to said first table.

10. The assembly according to claim 9, further comprising a pair of legs, each of said legs being coupled to and extending downwardly from said lower side of said second table, each of said legs abutting the support surface when said second table is coupled to said first table for retaining said second table in a horizontal orientation.

11. A portable awning and table assembly being configured to be positioned on a vehicle for providing shelter, said assembly comprising:
a vehicle having a cargo bed, said cargo bed having a rear end;
a pair of first supports, each of said first supports being positionable in said cargo bed having each of said first supports being vertically oriented, each of said supports comprising a first portion slidably receiving a second portion such that each of said first supports has a telescopically adjustable height, said first portion having a lower end, said second portion having an upper end, each of said first and second portions having a plurality of engagement points thereon, said engagement points being distributed along an entire length of said first and second portions, said lower end of said second portion of each of said first supports being inserted into a receiver on said cargo bed;
a pair of first pins, each of said first pins being extendable through a respective pair of said engagement points on said first and second portions of a respective one of said first support for retaining said first supports at a selected height;
a spool being rotatably coupled to between each of said first supports, said spool being positioned on said upper end of said first portion of each of said first supports, said spool being biased to rotate in a first direction, said spool being urgeable to rotate in a second direction;
a tarp being wrapped around said spool for storage, said tarp being selectively drawn off of said spool, said tarp having a distal end with respect to said spool, said distal end being spaced from said spool when said tarp is drawn off of said spool;
a pole being coupled to and being coextensive with said distal end of said tarp;
a pair of second supports each being vertically orientable on a support surface, each of said second supports being spaced a selected distance from said cargo bed, each of said second supports comprising a primary portion slidably receiving a secondary portion such that each of said second supports has a telescopically adjustable height, said secondary portion having a top end, each of said primary and secondary portions having a plurality of engagement points thereon, said engagement points on said primary and secondary portions being distributed along an entire length of said primary and secondary portions;

a pair of second pins, each of said second pins being extendable through a selected pair of said engagement points in said primary and secondary portions of a respective one of said second supports for retaining said second supports at a selected height;

a pair of receivers, each of said receivers being coupled to a respective one of said second supports, each of said receivers engaging said tarp when said tarp is drawn outwardly from said spool wherein said tarp is configured to shade an area therebeneath, each of said receivers being positioned on said top end of said secondary portion of said respective second support, each of said receivers having a first edge and a second edge, each of said receivers being concavely arcuate between said first and second edges such that each of said receivers forms a U-shape, each of said receivers insertably receiving said pole on said tarp;

a first table being removably coupled between said second supports having said first table being horizontally oriented for supporting objects, said first table having a first lateral side, a second lateral side, a bottom side and a front side;

a pair of couplers, each of said couplers being coupled to and extending downwardly from said bottom side of said first table, each of said couplers having a pair of apertures extending therethrough, each of said couplers being aligned with a respective one of said first and second lateral sides of said first table;

a plurality of third pins, each of said third pins being extendable through a respective one of said apertures in a respective one of said couplers to engage a selected one of said engagement points in said primary portion of a respective one of said second supports to removably couple said first table to said second supports;

a first fastener being coupled to said first table, said first fastener being positioned on and being coextensive with said front side of said first table, said first fastener comprising a leg extending forwardly from said front side and a foot extending upwardly from said leg and being spaced from said front side;

a second table being releasably coupled to said first table for increasing surface area for the objects, said second table having a lower side, a top side and a rear side, said top side extending rearwardly beyond said rear side to define a ledge on said rear side;

a second fastener being coupled to said second table, said second fastener being positioned on and being coextensive with said rear side, said second fastener being positioned beneath said ledge, said second fastener comprising a leg extending rearwardly from said rear side and a foot extending downwardly from said leg of said second fastener and being spaced from said rear side, said foot on said second fastener being positioned between said foot of said first fastener and said front side of said first table to releasbly couple said second table to said first table; and a pair of legs, each of said legs being coupled to and extending downwardly from said lower side of said second table, each of said legs abutting the support surface when said second table is coupled to said first table for retaining said second table in a horizontal orientation.

* * * * *